United States Defensive Publication [19] (H) [11] T958,006
Russin et al. [43] May 3, 1977

[54] METHOD FOR PROCESSING AMORPHOUS AND PARTIALLY CRYSTALLINE POLYMERS WITHOUT STICKING

[76] Inventors: Nicholas C. Russin, 312 McTeer Drive, Kingsport, Tenn. 37663; James H. Bond, 3429 Melrose Ave.; Ronald A. Tershansy, P.O. Box 3269, both of Kingsport, Tenn. 37664

[21] Appl. No.: 634,805

[22] Filed: Nov. 24, 1975

[51] Int. Cl.[2] ..... C08G 63/12
[52] U.S. Cl. ..... 260/75 T; 264/345; 264/349

[57] ABSTRACT

Method for treating pellets of a polyester polymer, such as a polyester polymer of poly(ethylene terephthalate), having at least some non-crystalline portions to prevent sticking when heated above the glass transition temperature. The method comprises mixing with pellets of the polyester polymer an amount of about 0.25% to about 5% by weight of crystalline fines which are less than 40 mesh in size, and preferably less than 140 mesh in size, of the same type polymer prior to or while the pellets are being subjected to temperatures above the glass transition temperature. The crystalline fines may also be mixed with pellets of amorphous polyester polymer. Other examples of polymers with which this treatment will also be effective are poly(tetramethylene terephthalate); poly(1,4-cyclohexanedimethylene terephthalate); poly(1,4-cyclohexanedimethylene terephthalate) modified with isophthalic acid; and a copolymer of 3:1 terephthalic:adipic acids and 3:1 ethylene:tetramethylene glycols.

No Claims, No Sheets Drawing,
5 Pages Specification

The file of this unexamined application may be inspected and copies thereof may be purchased (849 O.G. 1221, Apr. 9, 1968).